Feb. 6, 1951     B. McC. BIRD     2,540,418
ANIMAL TRAP
Filed Dec. 9, 1947     2 Sheets-Sheet 2
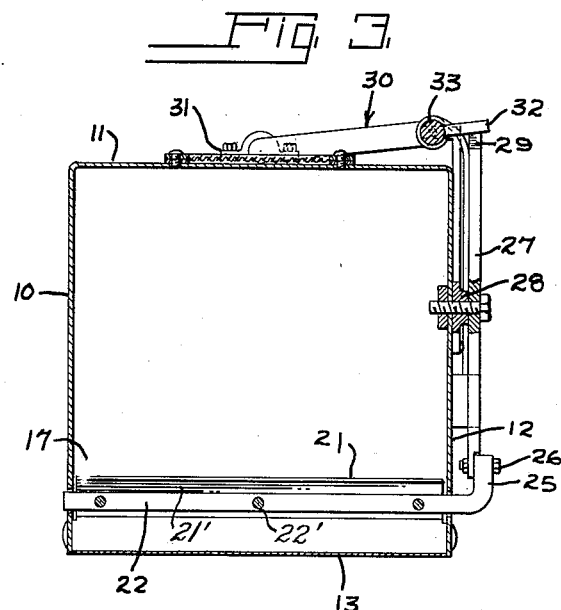
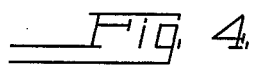
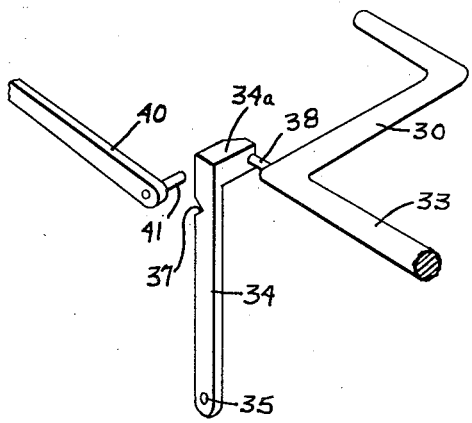
Inventor
BENJAMIN M. BIRD
By Semmes, Keegin, Robinson & Semmes
ATTORNEYS Patented Feb. 6, 1951

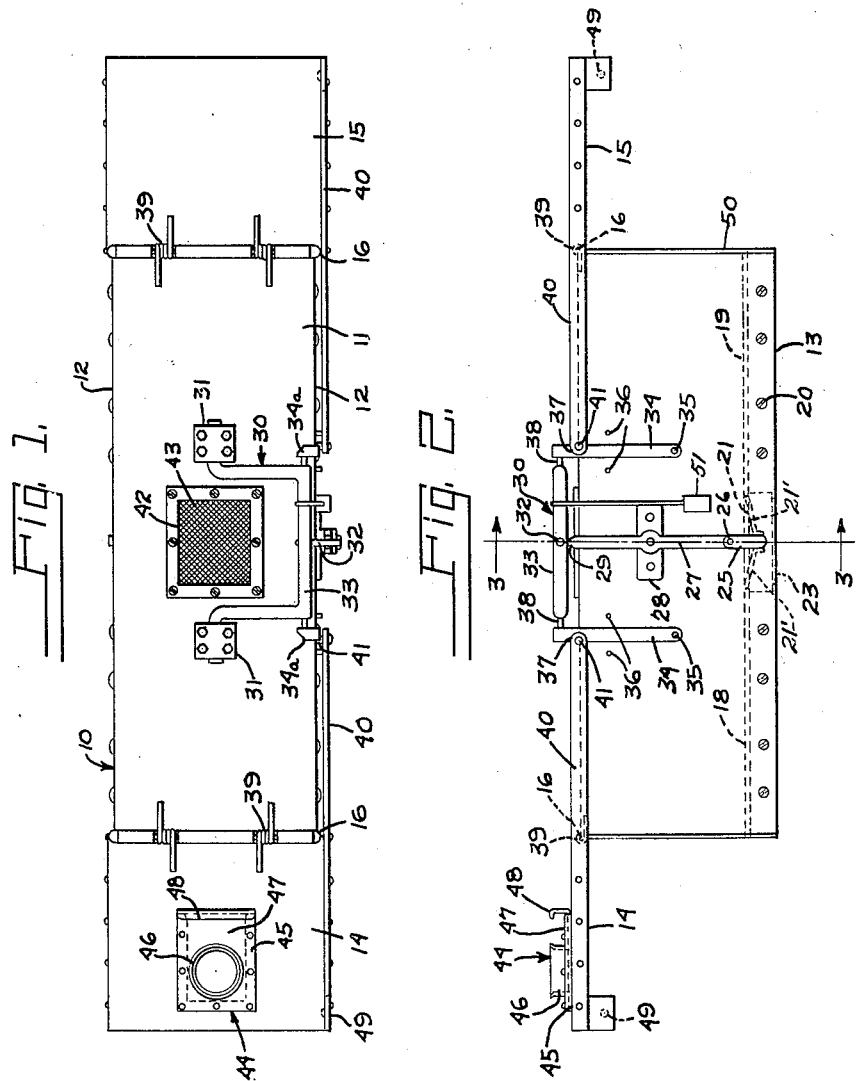

2,540,418

UNITED STATES PATENT OFFICE 2,540,418

ANIMAL TRAP

Benjamin McConnell Bird, Statesboro, Ga.

Application December 9, 1947, Serial No. 790,493

7 Claims. (Cl. 43—61)

The present invention relates to animal traps, and has particular reference to improvements in animal traps of the cage type provided with a door at either end, the doors being sprung to closed position by passage of an animal through the trap.

It is an object of the present invention to provide an animal trap which may be simply and inexpensively constructed, and which is characterized by ease and efficiency of operation.

A further object is to provide a novel tripping mechanism for use with animal traps of the open end cage type, which cannot be observed by an animal approaching the trap.

A further object is to provide a novel animal trap of the cage type which is of durable construction, and which presents a trap tunnel or run completely free from wires, members protruding from the trap walls or floor or other mechanism which might reduce the effectiveness of the trap.

Other objects and advantages will be apparent from the following detailed description thereof and the drawings, wherein:

Figure 1 is a top view of the device;

Figure 2 is a side view thereof;

Figure 3 is a cross-sectional view thereof taken along the lines 3—3 of Figure 2; and Figure 4 is an enlarged perspective view of the tripping mechanism of the invention shown in Figure 2.

The present invention embodies an animal trap of the tunnel or cage type wherein trap doors at either end of the tunnel are released by a trip mechanism actuated by passage of an animal through the trap. The trip mechanism includes a treadle forming a part of the floor of the trap tunnel which, when displaced from normal or level position by the weight of the animal, actuates a series of linkages to release simultaneously the trap doors for closure by a spring, weight, or other means. A carrying handle for the trap forms a part of the linkage associated with the trip mechanism.

Referring now to the drawings, the numeral 10 refers to the body of the trap including a top panel 11, side walls 12, a bottom 13, and trap doors 14 and 15 hingedly mounted at 16 on either end of the frame of the trap to close off the trap tunnel or run indicated in Figure 3 as 17. The trap may be constructed of any material of sufficient strength, durability and resistance to exposure, and such as will contain an animal trapped therein against efforts to escape. For purposes of economy and ease of manufacture, the trap may be constructed of sheet metal, the invention not being limited to use of a particular material in constructing the device.

The bottom 13 of the trap supports two floor sections 18 and 19 spaced therefrom and secured thereto by screws 20. The floor sections 18 and 19 are spaced from each other, and are joined by a rocker plate or treadle 21 positioned in the plane of the floor sections and mounted upon flanged support plates 21' which are secured by bolts 22' to a rocker arm 22 which is journalled in the opposite walls 12 of the cage by screws or other conventional means whereby movement of the treadle is transmitted to and rocks the rocker arm 22. The bottom 13 of the trap is provided with a removable panel 23 positioned directly beneath the treadle 21 which serves as a means of entry to the trap beneath the treadle, for cleaning purposes.

The trip mechanism actuated by disturbance of the treadle 21 as by rocking on the rocker arm 22, includes an extension 25 of the rocker arm 22 joined by a bolt 26 to the lower end of a rod 27 pivotally mounted on a bracket 28 positioned on the side wall 12 of the cage. The other extremity of the rod 27 is provided with a knife edge 29.

A carrying handle 30 secured to the top panel 11 of the trap by brackets 31 forms a stop member which is provided with a seat pin 32 on the carrying handle grip 33 adapted to rest upon the knife edge 29 of the rod 27 when the rod 27 is positioned vertically by adjustment of the treadle 21 to level position with respect to the floor sections 18 and 19. Preferably a weight 51 may be hung upon the carrying handle 30 to ensure dropping of the handle 30 to free the stop pins 38 from engagement with the trigger arm extensions 34a when the treadle 21 is moved from normal position by passage of an animal through the trap.

The trigger mechanism comprises two trigger bars 34 having lateral extensions 34a on their upper ends the bars being mounted pivotally at 35 to swing through an arc defined by stop pins 36 on the side wall 12. The bars 34 are provided with V notches 37 for purposes to be described. The trigger bars 34 are maintained in upright or set position by means of two stop pins 38 provided on either side of the carrying handle 30 which engage the trigger bars 34 when the handle 30 is supported by the rod 27.

The trap doors 14 and 15, pivotally mounted at 16 for reciprocation between open and closed position normally are urged into closed position by springs 39. Each door is provided with an arm porting the carrying handle whereby the trigger mechanism is sprung from set position to release the trap doors for movement to closed position.

6. An animal trap comprising a box having a bottom, side walls, a top panel and open ends, trap doors normally closing the open ends, trigger mechanism movable to a set position for securing the doors in open position, a carrying handle movable to a position for maintaining the trigger mechanism in set position, means normally urging the carrying handle from said position, a support maintaining the carrying handle against the action of said means, and trip a rockable trip member operable to move the support from the carrying handle maintaining position, whereby the trigger mechanism is moved from set position.

7. An animal trap comprising a box having a bottom, side walls and a top and having open ends, trap doors for closing the open ends, means normally urging the doors to closed position, trigger bars pivotally secured at one end to a side wall and having a retaining notch at the other end for engagement with the doors to hold the doors in open position, a carrying handle on the top panel movable to a set position between the trigger bars to hold the shafts in engagement with the doors, a rod on the side wall normally supporting the handle in set position, and trip means within the box for displacing the rod from handle supporting position, releasing the trigger bars for movement on the pivots to release the doors from the retaining notches.

BENJAMIN McCONNELL BIRD.

REFERENCES CITED

The following references are of record in the file of this patent:

UNITED STATES PATENTS

| Number | Name | Date |
| --- | --- | --- |
| 146,887 | Doremus | Jan. 27, 1874 |
| 253,907 | Andre | Feb. 21, 1882 |
| 383,972 | Mittler | June 5, 1888 |
| 1,071,678 | Maxwell | Aug. 26, 1913 |
| 1,228,802 | Maxwell | June 5, 1917 |
| 1,360,038 | Sichmeller | Nov. 23, 1920 |
| 1,575,456 | Sparks | Mar. 2, 1926 |
| 1,686,432 | Bleck | Oct. 2, 1928 |

FOREIGN PATENTS

| Number | Country | Date |
| --- | --- | --- |
| 155,897 | Great Britain | of 1920 |